(12) United States Patent
Lammers et al.

(10) Patent No.: US 9,794,313 B2
(45) Date of Patent: Oct. 17, 2017

(54) METHODS AND SYSTEMS TO FACILITATE SYNCHRONIZATION OF MULTIPLE MEDIA STREAMS

(71) Applicant: CISCO TECHNOLOGY, INC., San Jose, CA (US)

(72) Inventors: Joris Lammers, Poperinge (BE); Samie Beheydt, Geluwe (BE); Jan De Smet, Lokeren (BE)

(73) Assignee: Cisco Technology, Inc., San Jose, CA (US)

( * ) Notice: Subject to any disclaimer, the term of this patent is extended or adjusted under 35 U.S.C. 154(b) by 672 days.

(21) Appl. No.: 14/273,982

(22) Filed: May 9, 2014

(65) Prior Publication Data
US 2015/0326632 A1    Nov. 12, 2015

(51) Int. Cl.
| G06F 15/16 | (2006.01) |
|---|---|
| H04L 29/06 | (2006.01) |
| H04L 29/08 | (2006.01) |
| H04N 21/43 | (2011.01) |
| H04N 21/218 | (2011.01) |
| H04N 21/242 | (2011.01) |
| H04N 21/61 | (2011.01) |
| H04N 21/647 | (2011.01) |
| H04N 21/2389 | (2011.01) |
| H04N 21/8358 | (2011.01) |

(52) U.S. Cl.
CPC .......... *H04L 65/60* (2013.01); *H04L 67/1095* (2013.01); *H04N 21/2181* (2013.01); *H04N 21/23892* (2013.01); *H04N 21/242* (2013.01); *H04N 21/4307* (2013.01); *H04N 21/6125* (2013.01); *H04N 21/647* (2013.01); *H04N 21/8358* (2013.01)

(58) Field of Classification Search
CPC ........................... H04L 65/60; H04N 21/4307
USPC ..................... 709/231–232; 348/500
See application file for complete search history.

(56) References Cited

U.S. PATENT DOCUMENTS

| 4,739,398 A | 4/1988 | Thomas et al. |
|---|---|---|
| 6,067,411 A * | 5/2000 | Poimboeuf ............... G06F 1/06 713/400 |

(Continued)

FOREIGN PATENT DOCUMENTS

| EP | 2 293 539 A2 | 3/2011 |
|---|---|---|
| EP | 2 293 570 A1 | 3/2011 |

OTHER PUBLICATIONS

International Search Report dated Jul. 31, 2015 cited in Application No. PCT/US2015/029282, 11 pgs.

*Primary Examiner* — Bharat N Barot
(74) *Attorney, Agent, or Firm* — Merchant & Gould P.C.

(57) ABSTRACT

A method can include receiving, at a given node, a continuous stream of input media from a media source. A value can be computed as a function of each of a plurality of data blocks of the continuous stream of input media received by the given node. The method can also include receiving, at the given node, values computed for a plurality of data blocks of the continuous stream received by another node. A set of the received values from the other node can be correlated with a set of the computed values for the given node to determine an offset between the blocks of the continuous stream of input media that are received by the given node and the blocks of the continuous stream of input media that are received by the other node.

20 Claims, 7 Drawing Sheets

(56) References Cited

U.S. PATENT DOCUMENTS

| | | | |
|---|---|---|---|
| 8,126,061 B2 * | 2/2012 | Cooper | H04N 21/4347 375/240.25 |
| 8,726,061 B2 * | 5/2014 | Poimboeuf | G11B 27/10 348/500 |
| 8,943,534 B2 * | 1/2015 | Reisner | H04N 21/2668 725/32 |
| 2002/0103919 A1 | 8/2002 | Hannaway | |
| 2012/0036277 A1 * | 2/2012 | Stokking | H04N 21/4307 709/231 |
| 2013/0044803 A1 | 2/2013 | Fisher et al. | |
| 2013/0290557 A1 * | 10/2013 | Baratz | H04L 65/60 709/231 |
| 2013/0336435 A1 | 12/2013 | Akkihal et al. | |
| 2015/0215497 A1 * | 7/2015 | Zhang | H04N 21/4307 348/521 |
| 2016/0234570 A1 * | 8/2016 | Van Deventer | H04N 21/4307 |

* cited by examiner

METHODS AND SYSTEMS TO FACILITATE SYNCHRONIZATION OF MULTIPLE MEDIA STREAMS

TECHNICAL FIELD

This disclosure relates to communications and, more particularly, to methods and systems to facilitate synchronization of media streams.

BACKGROUND

Adaptive bitrate streaming is a technique used in streaming multimedia over computer networks. It works by employing a transcoder or encoder to adjust the quality of a video stream based on user parameters that can be detected in real time. Such encoder or transcoder can encode a single source video at multiple bitrates. In an architecture that might include multiple encoders or transcoders, such as for back-up or redundancy purposes, each encoder or transcoder needs to have its video and audio chunk boundaries properly synchronized. For example, each of the encoders can utilize a timing signal (e.g., a time code, such as linear time code (LTC) or vertical interval time code (VITC)) that is inserted into the video source to uniquely identify video source frames. However, in some cases the timing signal can be missing or require expensive equipment to add the timing signals.

DESCRIPTION OF EXAMPLE EMBODIMENTS

Overview

This disclosure relates generally to communications and, more particularly, to synchronization of streaming data.

As an example, a method can include receiving, at a given node, a continuous stream of input media from a media source. A value can be computed for each block of a plurality of blocks in the continuous stream of input media received at the given node. Each value can be computed as a function of a respective one of the plurality of blocks of the continuous stream. The method can also include receiving, at the given node, values computed for a plurality of data blocks of the continuous stream received by another node. A set of the received values from the other node can be correlated with a set of the computed values for the given node to determine an offset between the blocks of the continuous stream of input media that are received by the given node and the blocks of the continuous stream of input media that are received by the other node.

As another example, an apparatus can include an identifier generator configured to compute an identifier value based on each block of input media content in an input media stream received at a given node from a media source. A plurality of computed identifiers for at least one sequence of blocks of the input media content can be stored in memory. An offset calculator can be configured to determine an offset between blocks of the input media stream received by the given node and at least one other node based on a correlation between a set of the plurality of computed identifiers for the given node relative to another set of identifiers computed based on a sequence of the blocks of the input media content received at the at least one other node.

As yet another example, a system can include a plurality of nodes configured to receive a continuous stream of input media content from a common media source. Each of the plurality of nodes can be configured to produce and deliver adaptive bitrate media content via a network. Each of the plurality of nodes can be configured to compute a unique identifier value for each block of a sequence of blocks of the continuous stream of input media content received by each respective node. Each node can also be configured to receive, at the respective node, values computed for a sequence of blocks of the continuous stream received by at least one other node of the plurality of nodes. Each node can also be configured to correlate a set of the received values from the other node with a set of the computed values for the respective node over a range of offset values. Each node further can be configured to determine a corresponding offset value from the range of offset values that affords synchronization between the blocks of the continuous stream of input media content that are received by the respective node relative to the blocks of the continuous stream of input media content that are received by each other node of the plurality of nodes.

Example Embodiments

Figure 1:
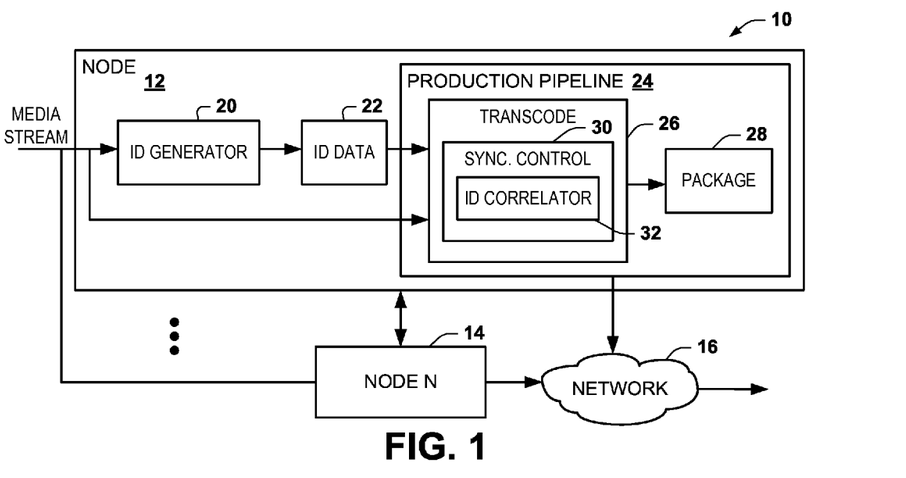
FIG. 1 depicts an example of part a media delivery system to facilitate synchronization of multiple media streams.

FIG. 1 depicts an example of part of a media delivery system 10. The system 10 includes a plurality of nodes 12 and 14, demonstrated as Node 1 through Node N, where N is a positive integer denoting the number of nodes. Each of the respective nodes 12 and 14, for example can be implemented to ingest the common continuous media stream. As an example, the continuous media stream can be provided from a media source via a digital video interface, such as the serial digital video interface (SDI) standardized by the Society of Motion Picture and Television Engineers (SMPTE). Thus, the media stream can be a digital media stream of a standard definition link, a high definition link, or any other resolution link. The input media stream can be an uncompressed media stream that is provided via the corresponding interface protocol.

The input media stream can be a continuous video stream that includes a series of digital media blocks. Each media block in the input media stream can include digital data representing a picture (e.g., an image) and ancillary data, such as can include audio data, subtitles, and related metadata associated with the picture of such block. For example, where the input media stream is an interlaced video, the blocks of the input media stream can be implemented as respective fields. In an example where the input media stream is in a progressive format, the blocks of the input media stream can be implemented as frames. In some cases, a timing signal or time code, such as LTC or VITC) may be inserted into the input media stream. However, in many cases, such timing signals are not present in the input media stream or otherwise may be corrupted in the signals received by one or more of the nodes 12 and 14. Accordingly, as disclosed herein, each of the nodes 12 and 14 is configured to generate a unique identifier based on the content of incoming blocks of the input media stream to enable synchronization of the media content provided by two or more such nodes without requiring the presence of such time codes.

The nodes 12 and 14 can be implemented in the system 10 as part of a redundancy architecture in which each of the respective nodes can operate as a back-up pipeline that can provide for adaptive bit rate (ABR) transcoding or encoding of the input media stream. In order to enable back-up in such a redundancy architecture of the system 10, both of the respective nodes are configured to enable synchronization of the input media stream by identifying respective blocks in the input media stream. Each of the nodes 12 and 14 thus can correspond to an ABR transcoding or encoding node configured (e.g., as part of media production pipeline including a transcoder/encoder and a packager) to generate aligned packetized chunks of streaming content for one or more video profiles.

While many examples disclosed herein describe the nodes 12 and 14 as ABR transcoding or encoding nodes for generating aligned streaming media in the context of a back-up architecture for the system (e.g., a content delivery network) 10, the nodes can be implemented to synchronize and align other types of data delivered via other delivery paradigms. In some examples, the nodes 12 and 14 can be at spaced apart different locations, such as node 12 at an East coast facility and node 14 at a West coast facility. In other examples, the respective nodes 12 and 14 can reside co-located, such as at a headend of a cable provider or other front-end of a media delivery pipeline within a given device (e.g., on separate circuit boards of a content distribution, such as encoders and transcoders, digital content managers, content delivery servers, or the like). In either example, each of the nodes 12 and 14 can operate on substantially bit identical source inputs, which may be offset from each other as disclosed herein, and in the absence of adequate time codes (e.g., VITC or LTC) in that source inputs to enable synchronization.

The content that is generated by one or more of the nodes 12 and 14 can be provided downstream for consumption by any number of one or more ABR clients. Additionally or alternatively, the content generated by such node(s) 12 and 14 can be stored in one or more non-transitory storage media (e.g., flash memory, hard disk drive or the like), such as at an origin server. Examples of ABR streaming protocols that can be utilized for generate the content for streaming each rendition of a video service can include HTTP Live Streaming (HLS), Adobe systems HTTP dynamic streaming, Microsoft smooth streaming, MPEG dynamic adaptive streaming over HTTP (DASH) or other streaming protocols.

In the example of FIG. 1, the node 12 includes an ID generator 20 that is configured to compute an identifier (ID) based on content in the blocks of media data received in the input media stream. The ID generator 20 can be hardware and/or software configured to compute the ID as a substantially unique value computed based on content in each block of media data provided. As used herein, the term "substantially" as a modifier does not require that each ID be absolutely, globally unique but that the computation performed be variable as a function of the content and be deterministic. For instance, the ID generator 20 may compute the same ID for different blocks of media data, such as if content of such different blocks, based on which the ID value is computed, is the same for the blocks. This might occur if the ID value is computed, for example, from only the active video portion of consecutive frames of a still picture. Typically, however, each computed ID can uniquely represent each block of media data in the input media stream according to the media content based on which each respective ID is computed. Once the still picture has transitioned to a moving (e.g., changing) picture, the ID values computed subsequent frames would change accordingly, such that synchronization between receiving nodes 12 and 14 would resume, as disclosed herein.

The ID generator 20 can compute the ID for each block of data in the media stream by computing a function based on content of the respective block. As an example, the ID generator 20 can be configured to compute the ID value as a function of the entire block of data including the active video portion and the ancillary data. In other examples, the ID generator 20 can compute the ID value as a function of a selected portion of the block of the input media stream, such as only based on the active video portion or based on the ancillary data. As one example, the ID generator 20 can be configured to compute a cyclic redundancy check (CRC) value that can be stored at the ID value for each of the respective blocks of the media stream. The CRC that is computed is not used to help maintain data integrity as is well-known, but instead is used to facilitate synchronizing different nodes 12 and 14 with respect to each other. For example, the ID generator 20 can be implemented in the node 12 as an FPGA (field programmable gate array) or other hardware configured to compute the CRC on each respective block of the input media stream. Regardless of the type of computation employed to generate the ID, each of the nodes 12 and 14 can include a corresponding ID generator configured to employ the same computation for deterministically generating the ID for the blocks of media data received in the input media stream.

The ID generator 20 thus can provide ID data 22 which can include computed IDs for a plurality of sequential blocks of the input media data. For instance, the ID data can include a moving window of data containing a plurality of sequential IDs computed by the ID generator 20. Each of the ID values can be programmatically associated (e.g., tagged) with a particular block sequence number, such as frame numbers or field numbers according to the video format for the respective input media stream. The block sequence numbering can be arbitrary for each node, and thus can be different for each respective node. For example, each node can start at different times and in turn begin counting blocks also at different times. The approach disclosed herein thus provides a content-based mechanism to enable alignment and synchronization of media blocks despite different block numbers that can be associated with each block, as well as without requiring LTC or VITC codes. For example, the window of ID data 22 can be stored in memory, as a fixed size window (e.g., a data structure implemented as a first-in-first-out buffer) that includes a set of computed ID values for a fixed number of a sequence of blocks of the media data in the input stream.

The input media stream can also be provided to a corresponding content production pipeline 24 associated with the node 12. The production pipeline can include a transcoder/encoder 26 configured to provide transcoded or encoded media of ABR content (e.g., one or more elementary streams) to a package stage 28. For example, the transcoder/encoder 26 can be configured to transcode or encode the input media content to one or more bitrates according to a respective ABR profile for a video service. For instance, a given service can include any number of transport streams, and each transport stream can include a respective content profile (e.g., also referred to as a rendition). The parameters for each content profile can include codec, codec profile, video and audio bitrate, width and height, frame rate, and the like.

For example, the transcoder/encoder 26 can include a plurality of transcoders, each configured to convert a packetized elementary stream of to one or more different bitrate output streams by changing coding parameters, including media resolution. Alternatively or additionally, the transcoder/encoder 26 can include a plurality of encoders to encode the input stream into packetized output stream with a desired coding. Each of the output media streams can be provided to the packager 28. The packager 28 can be configured to generate corresponding packetized ABR content data for each respective stream provided by the transcoder/encoder 26. The ABR content data can include an ABR package for each of a plurality of different output streams. Each ABR package can include a plurality of media chunks that in sequence correspond to the packetized media encoded for a respective bitrate and resolution, for example.

The pipeline 24 can include a synchronization control 30 that can be configured to coordinate synchronization of the content in the input media stream with one or more other of the nodes 14. The synchronization can include synchronizing chunk boundaries in each of the output streams provided by the packager 28 with chunk boundaries in the nodes 14. For example, the synchronization control 30 can employ a communications interface (not shown) to coordinate an exchange of information between the node 12 and each node 14, which information includes at least a portion of the ID data 22. For example, the node 12 can provide a limited window of the ID data corresponding to a proper subset (e.g., less than all) of the window of ID values stored in the ID data 22 and provide such limited window of ID data to the node 14 via a communications link. Similarly, each other node 14 in the system 10 can provide a corresponding limited window of ID value computed by an ID generator of the node 14 and provide such information to the node 12 for use by the synchronization control 30.

As a further example, the synchronization control can implement an ID correlator 32 that is configured to compute a measure of similarity between the limited window of ID values received in a message from each node 14 relative to the window of ID values stored in the ID data 22. Each of the ID values in the computed ID data being compared has an associated block number (e.g., frame or field number). The correlation thus can be implemented over a range of offset values between the respective block numbers. The correlator 32 of the synchronization control can determine the offset as a difference between block numbers that provide for a match among the sets of ID values based on analysis of the correlation results.

The synchronization control 30 thus can employ the offset to enable alignment of the input media stream received by each of the respective nodes 12 and 14 relative to each other. For example, the computed offset can be employed to synchronize chunk boundaries in the output ABR streams that can be provided by the nodes 12 and 14 downstream via the network for distribution or storage. In some examples, such as if the production pipeline 24 fails and the output stream from the node 14 is provided as a back-up output, the computed offset can be used to maintain synchronization of the output stream (by aligning chunk boundaries based on the offset). The computed offset thus enables each of the nodes 12 and 14 to compensate and correct minor source delays in the input media stream, such as source routing delays to different physical locations of the encoders.

While the ID correlator 32 is demonstrated in the example of FIG. 1 as residing within the synchronization control 30 of the transcoder/encoder 26, it is to be understood that the ID correlator could be separate from the synchronization control and/or separate from the transcoder/encoder. In some examples, the ID generator 20 and the ID correlator 32 can operate external to the node 12 to enable the synchronization control 30 to coordinate synchronization of the input media stream with respect to one or more of the other nodes 14. Additionally, the approach disclosed herein is sufficiently robust to implement synchronization among the nodes 12 and 14 even in the presence of still frames, black frames, 3:2 pull down or other patterns that might be provided in the source input streams to such nodes.

Figure 2:
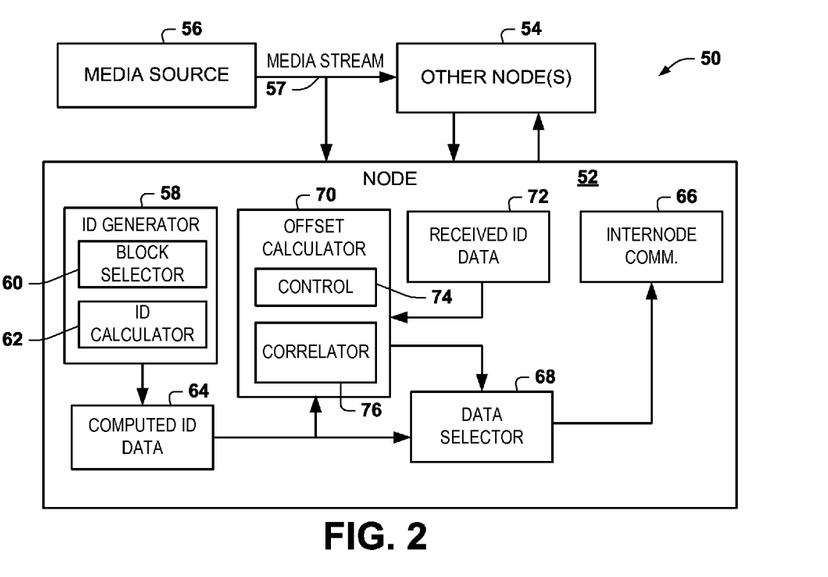
FIG. 2 depicts an example of a node configured to facilitate synchronization of media streams.

FIG. 2 depicts an example of another system 50 that can be implemented to facilitate synchronization of an input media stream that is provided to two or more nodes 52 and 54. The system 50 can include a media source 56 configured to provide a common media stream 57 to a plurality of the nodes 52 and 54. As described herein, the stream 57 may arrive at the different nodes at different times, such as due to potential routing delays. Accordingly, the blocks of media data may be offset when received for processing by the respective nodes. Each of the nodes can be implemented similar to the node 12 disclosed with respect to FIG. 1. For example, the nodes 52 and 54 can provide redundant production pipelines for an ABR media delivery system.

In the example of FIG. 2, the node 52 includes an ID generator 58 that is configured to substantially uniquely identify each of the blocks of the input media stream. The ID generator 58 can include a block selector 60 configured to sample each blocks of the media stream for processing by an ID calculator 62. For example, the block selector 62 can provide each respective block from the input media stream or selected blocks thereof to the ID calculator 62. The ID calculator 62 can be configured to compute an ID value to substantially uniquely identify each block in the media stream. The computed ID value can be stored in memory as computed ID data demonstrated at 64.

As a further example, the ID calculator 62 can be configured to compute a CRC value for each block of data in the sequence of data to provide the corresponding computed ID data 64. Other functions could be utilized by each of the node to compute the respective block ID values, such as hash key or the like. A similar set of computed ID data can be generated at each of the other nodes 54. Since, ideally, the input media stream received by each of the nodes are the same except for possible delays, a given sequence of computed ID values should be the same for the same blocks of media data.

The computed ID data 64 can include each computed ID value as well as an identification of a corresponding block number. That is, the computed ID data 64 can include the computed ID value and one or more respective block numbers. For example, a block number can be provided for a first block in a sequence of each set of ID values, which can be used to determine a block identifier for each other block in the ID values computed for a sequence of media blocks. The set of ID values can be ID values computed for a fixed number of sequential media blocks that are stored in memory as a moving window of computed ID values for the respective blocks over time, such as disclosed herein.

The selected portion of the computed ID values and block sequence information can be provided to the other nodes 54 via an inter-node communication block 66. For example, a data selector 68 can select a limited window from the window of ID data 64, such as corresponding to a proper subset of the ID data. The data selector 68 can periodically send the selected subset of ID data (as the limited window) to the other nodes via the inter-node communication component 66. Each of the nodes 54 thus can process the received of limited window of computed ID data from the node 52 to ascertain a corresponding offset between the input media stream received by such other node 54 relative to the media stream received by the node 52. As disclosed herein, the offset can be employed to enable synchronization of the respective input media streams that are received by each of the nodes 52 and 54 and, therefore, enable alignment of agreed upon chunk boundaries, such as in a redundancy architecture content delivery system (e.g., the system 10 of FIG. 1).

The node 52 also includes an offset calculator 70 that is configured to compute a relative offset between the media stream blocks received by the node 52 relative to the media stream received by one or more of the other nodes 54. For example, the node 52 can store a set of received ID data 72 from the other node 54, such as may be communicated in a message via the inter-node communication component 66. Thus, each of the nodes 52 and 54 can exchange a limited window of computed ID values for a subset of media blocks to enable the offset calculator 70 of each respective node to compute a corresponding offset.

The offset calculator 70 can include a control component 74 that is configured to control the offset calculation process that compares the received ID data 72 relative to the computed ID data 64. As disclosed herein, the number of data blocks for which ID values are computed in the received ID data 72 will typically be smaller than the number of blocks represented by the computed ID data for the node 52. The control 74 thus enables the comparison by incrementally adjusting the offset between the respective limited window of the received ID data 72 from the other node 54 and effectively move the ID values of the limited window with respect to a sequence of ID values in the larger window of ID data 64 computed for the node 52. The range of offset values through which the control 74 increments can be determined based on relative range of block numbers in the limited window from the node 54 with respect to the range of block numbers in the larger window for the node 52.

The offset calculator 70 employs a correlator 76 configured to compute a correlation between each of the ID values (the limited window) in the received ID data 72 relative to a corresponding sequence of the computed ID data 64. The results of each correlation between ID values in the sequence being compared can be summed together to provide an aggregate correlation for a given offset value, which is set by the control 74. The aggregate correlation for a range of offset values can be evaluated relative to each other to determine a corresponding offset between the input media streams received by each of the respective nodes 52 and 54 that affords an optimal alignment between the input media streams.

Since it is possible that errors, in addition to temporal delays, may also be introduced into blocks of media data in the input media stream received by the nodes 52 and 54, the correlation and evaluation of correlated results can employ a threshold that permits something less than an ideal correlation to indicate a match between the sets of ID values being compared. The threshold can be fixed or it can be user programmable in response to a user input. The offset calculator 70 determines the offset between the nodes 52 and 54 to correspond to the offset value that results in the best correlation and, if utilized, provides an aggregate correlation that exceeds the correlation threshold.

The offset value that results in correlated ID values can be stored in memory for use by the node 52 to enable synchronization media content between the nodes. Additionally, the node 52 can send the derived offset value to the other node 54, and each other node 54 likewise can send the node 52 the offset value derived with respect such node 52. The node 52 can compare the offset received from the other node 54 to the offset computed by the node 52 as a further check to ensure that the offset is accurate. For example, if the difference between the absolute value of each of the offsets is zero, it can be determined that the offset is accurate. However, if the node 52 determines that the difference between the absolute value of each of the offsets is not equal to zero, it can be ascertained that one or both nodes 52 and 54 have incorrectly derived the offset value. Such determination of an inaccurate offset can trigger each node 52 and 54 to recompute the offset between such nodes and exchange the recomputed offset values, which should be the same. The offset calculator 70 can be configured to determine an offset periodically. Additionally or alternatively, the offset calculator can be configured to compute the offset in response to a trigger, such as in response to receiving a limited window of ID values from the other node 54, in response to another command or detecting a predetermined event.

Figure 3:
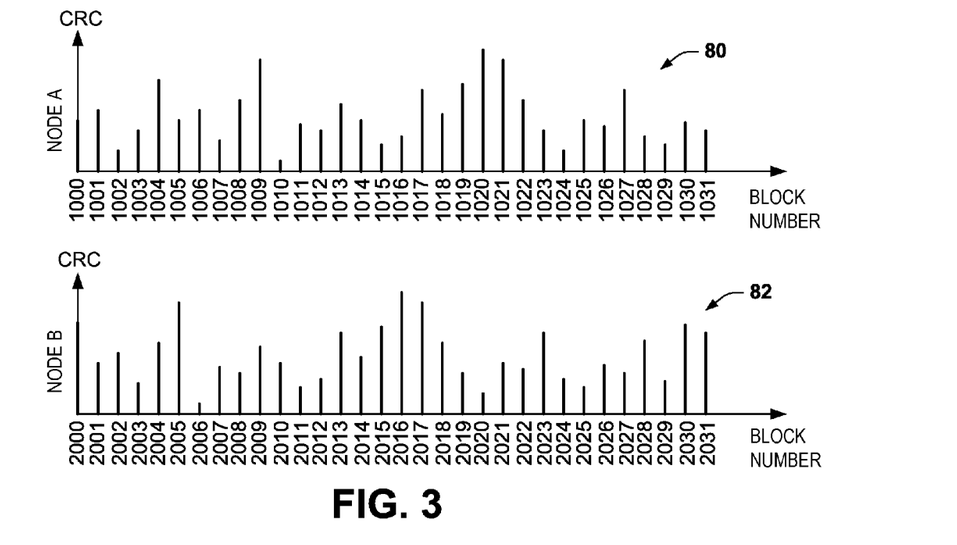
FIG. 3 depicts an example of identifier data computed for media streams provided to a plurality of nodes.
Figure 4:
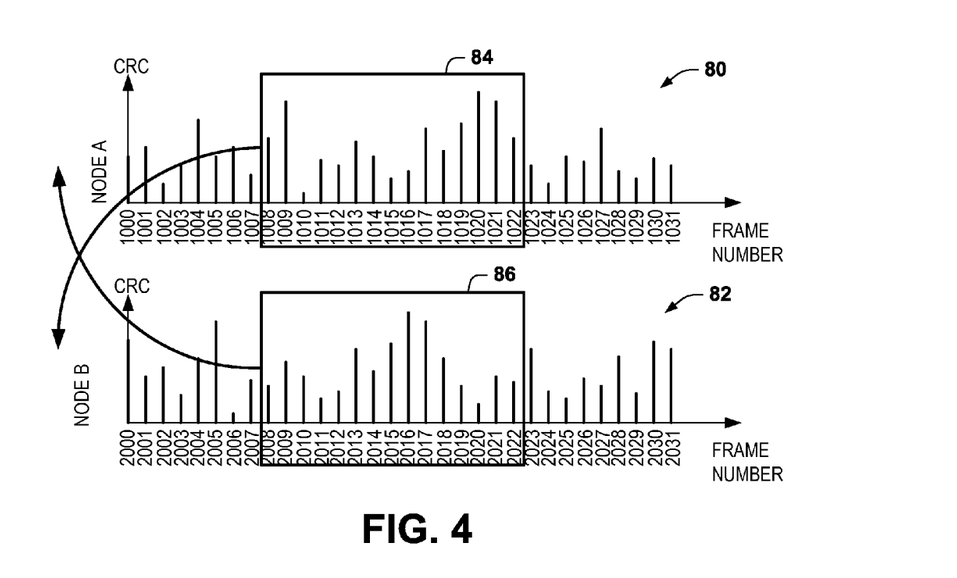
FIG. 4 depicts an example of identifier data that can be exchanged through nodes.
Figure 5:
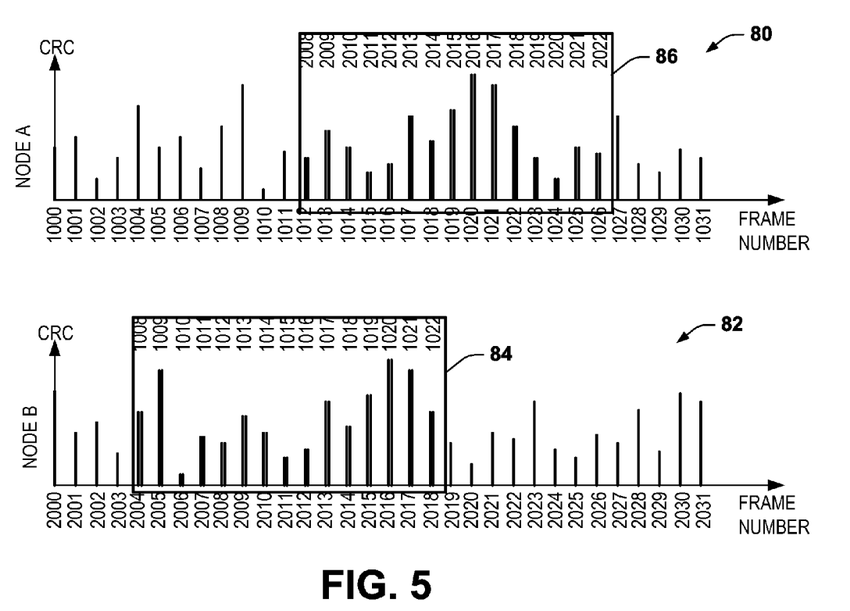
FIG. 5 depicts an example of identifier data correlated for multiple nodes.

FIG. 3 depicts an example of a sequence of ID values 80 computed for a sequence of 32 blocks of data for one node A (e.g., the node 52) and another sequence of ID values 82 computed for each block in a sequence blocks of data for another node B (e.g., the node 54). In the example of FIGS. 3, 4, and 5, the ID values 80 and 82 are demonstrated as CRC values. In other examples, however, different functions could be utilized to determine a unique ID value for each block of data, as disclosed herein. In the example of FIG. 3, the set of CRC values 80 can correspond to CRC values computed for a sequence of blocks ranging from block number 1000 to block 1031. The other set of CRC values 82 can correspond to CRC values are demonstrated as computed for a data block numbers ranging from 2000 to block 2031. Thus, each of the sets of CRC values 80 and 82 can correspond to a respective window of computed ID values, where the ID value in this example is a CRC value (e.g., computed by the ID generator 20 or ID calculator 62).

As mentioned, a data selector (e.g., data selector 68) can select a subset (a proper subset) corresponding to a limited window of the computed ID values and provide them to another node via the inter-node communication component 66. FIG. 4 represents a selected set of CRC values, demonstrated as subset 84 of the main set of ID values 80. In this example, the selected subset 84 corresponds to ID values computed for blocks 1008 to 1022, which is provided from one node A (e.g., the node 52) to another node B (e.g., node 54), such as via the inter-node communication component (e.g., component 66). The data selector 68 can operate to provide for the exchange for the limited window of computed ID values periodically or in response to scheduled events.

Also demonstrated in FIG. 4, a limited window of computed ID values, demonstrated at 86, is selected as a proper subset from the set of computed ID values 82. The subset of ID data 86 can be provided from node B to another node A (e.g., from the node 54 to the node 52). In the example of FIG. 4, the window of ID data 86 includes CRC values computed for each of blocks 2008 through 2022. Each of the nodes receiving the limited windows of ID data thus can employ an offset calculator (e.g., including the control 74 and correlator 76) to determine an offset that provides for the greatest correlation between the limited window received from another node with respect to the computed ID values computed by the node itself.

FIG. 5 depicts an example in which the ID values in the limited window 86 (from node B in FIG. 4) have been correlated with a corresponding sequence of ID values from the window of corresponding ID values for node A. For example, the ID values from blocks 2008-2022 received from node B have been determined (e.g., by correlator 76) to correlate with ID values computed by node A for blocks 1012-1026. FIG. 5 also demonstrates the limited window 84 (from node A in FIG. 4) being correlated by node B with the corresponding sets of CRC values for blocks 2004-2018. Thus, based on the correlation demonstrated in the example of FIG. 5, node A can determine an offset of −996 blocks of media content and node B can determine an offset of +996 blocks of media content. As disclosed herein, the offset can be utilized by synchronization control to establish a chunk boundary for the corresponding output stream of encoded media data that can be provided by the respective node.

In order to further demonstrate the correlation process (e.g., as can be implemented by offset calculator 70), FIGS. 6A-6H demonstrate an example of correlation for a limited window of CRC values, demonstrated at 90, computed for three consecutive blocks of media content demonstrated as block numbers 2008, 2009 and 2010. For instance, a given node (e.g., node 52) can receive the limited window of ID data 90 from another node (e.g., node 54). With reference back to FIG. 2, the offset calculator control 74 can selectively compare the limited window 90 of the CRC values from the other node with a selected sequence of CRC values from the node 52. For example, the control 74 can increment an offset over a range of offset values to align the limited window 90 with a different sequence of values for each correlation that is implemented (e.g., by correlator 76).

Figure 6A:
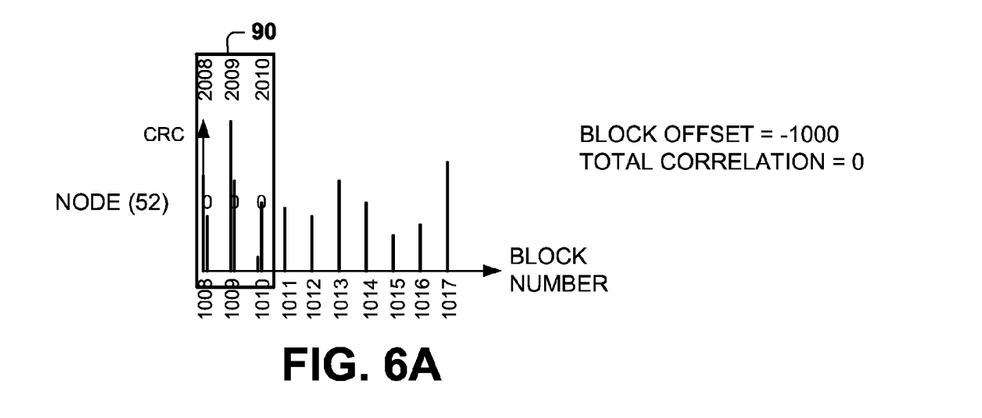
FIG. 6A-6H depicts an example of a process for correlating computed identifier data.
Figure 6B:
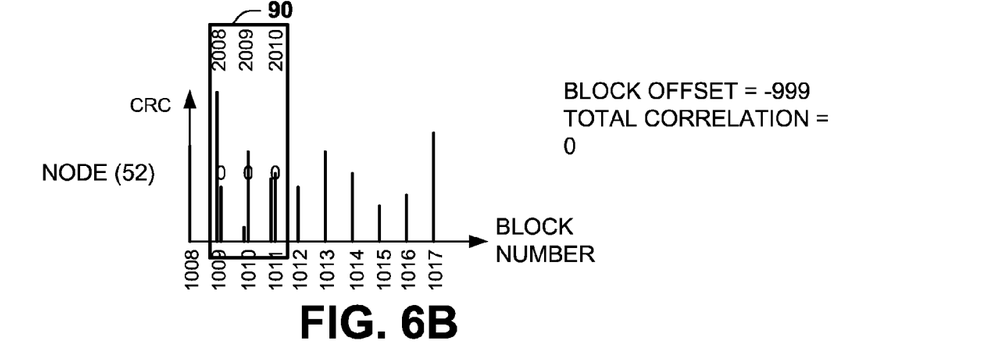
Figure 6C:
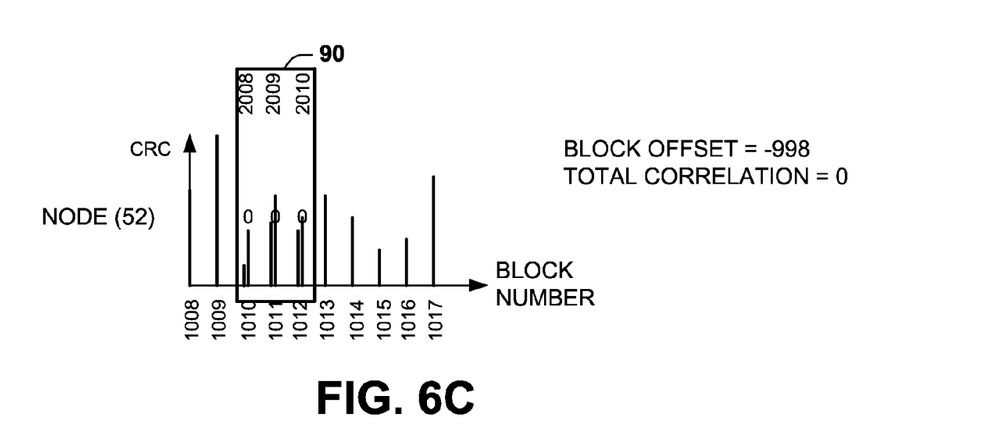
Figure 6D:
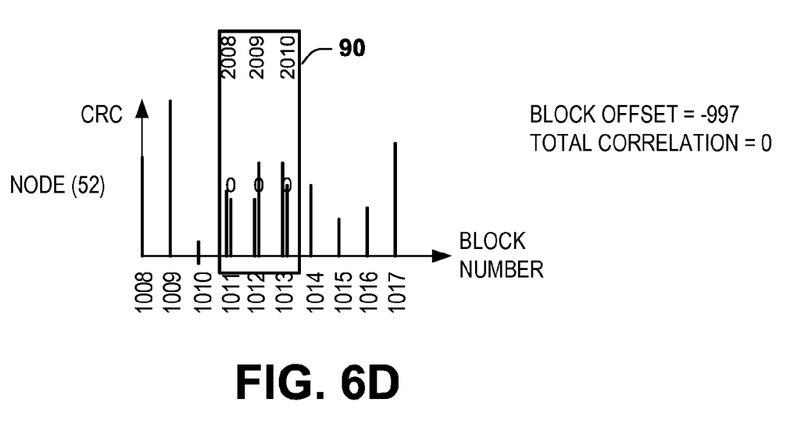

By way of example, in FIG. 6A, CRC values for block numbers 2008, 2009 and 2010 in the limited window 90 are correlated with respect to respective CRC values computed by node 52 for block numbers 1008, 1009 and 1010. In this particular example, the offset is set to −1000, such that the ID value for block 2008 is correlated to the ID value for block 1008, the ID value for block 2009 is correlated to the ID value for block 1009 and the ID value for block 2010 is correlated to the ID value for block 1010. In this example of FIG. 6A, an aggregate correlation value (e.g., determined by correlator 76) is 0 since none of the CRC values correlate. This process can be repeated over a range of offset values, such as demonstrated for FIGS. 6B-6H. As demonstrated in each the examples of FIGS. 6B, 6C, 6D, 6E, 6F, 6G and 6H, the control 74 can selectively adjust the block offset between the block numbers incrementally across the set of CRC values that are maintained in the window of computed ID data 64 and in turn compute an aggregate correlation between ID values for each respective offset.

Figure 6E:
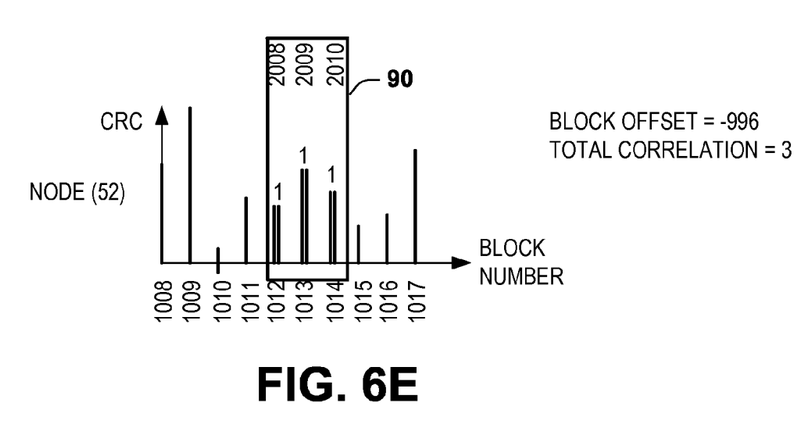
Figure 6F:
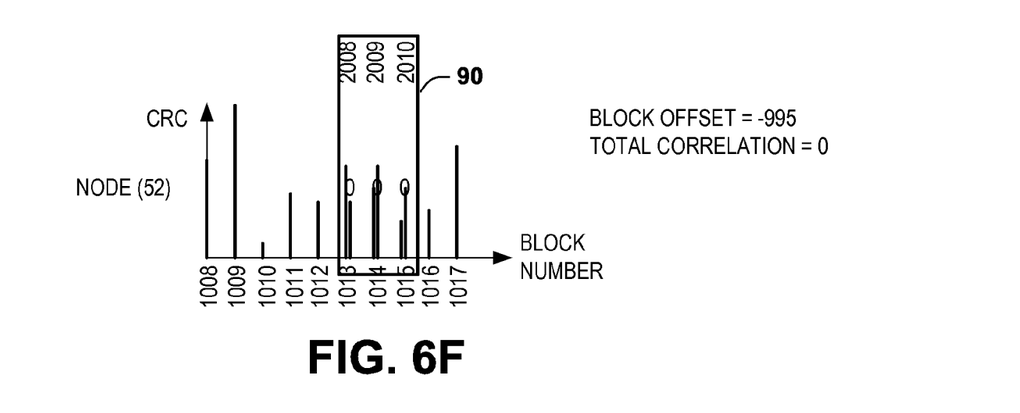
Figure 6G:
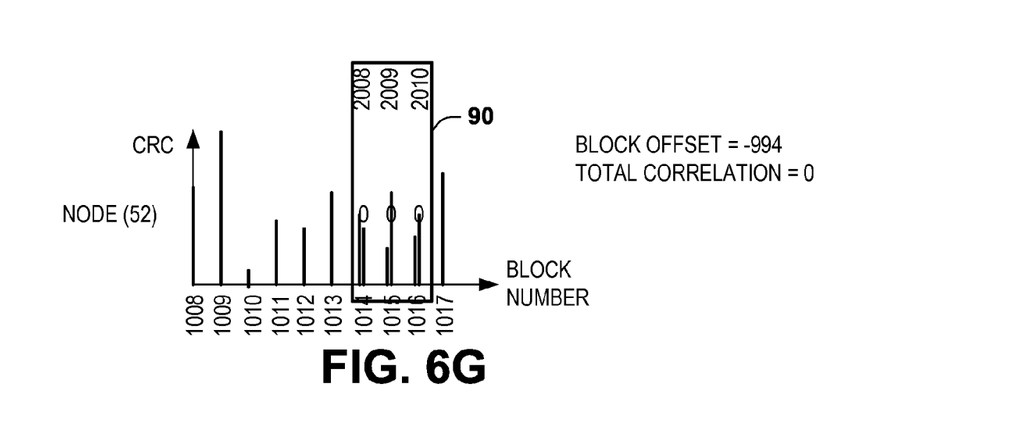
Figure 6H:
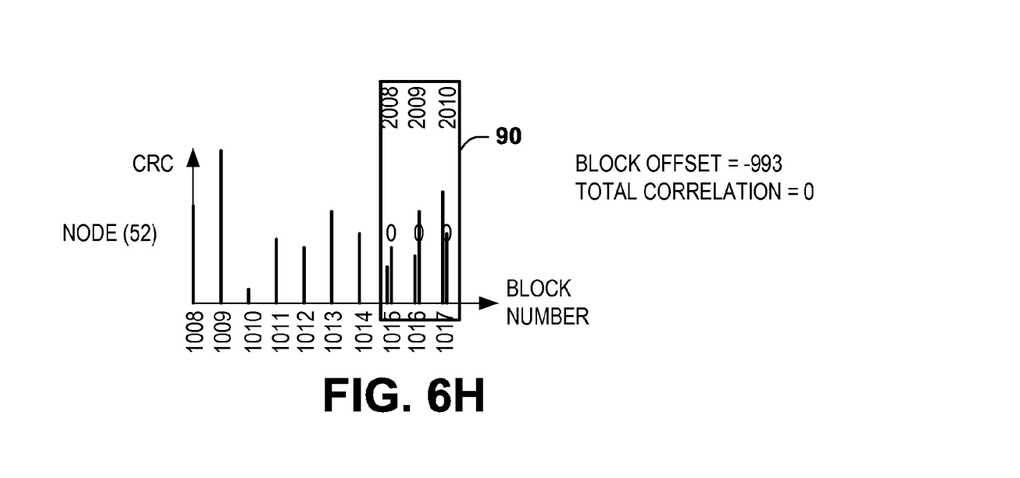

In the examples of FIGS. 6A-6H, the correlation demonstrated by FIG. 6E for a picture offset of −996 demonstrates an aggregate total correlation of 3. The total correlation determined for each other offset is determined to be zero. Thus, the correlation value of 3 for the example of FIG. 6E thus represents a match between the ID values from the limited window 90 and the ID values computed for the set of block numbers 1012 through 1014 computed for node 52. The offset value that results in correlated ID values can be stored in memory and/or exchanged between nodes to verify the accuracy of the derived offset values.

The examples of FIGS. 5 and 6 assume that the ID values computed by each node for the same blocks of media content are identical due to an absence of errors in the content of the respective media blocks used to compute the CRC values. In other examples, however, a corresponding correlation threshold can be set to allow for some errors in the correlation while ensuring that the amount of correlation is sufficient to indicate a match between the limited window provided from the other node and the set of CRC values computed by a given node itself.

Figure 7:
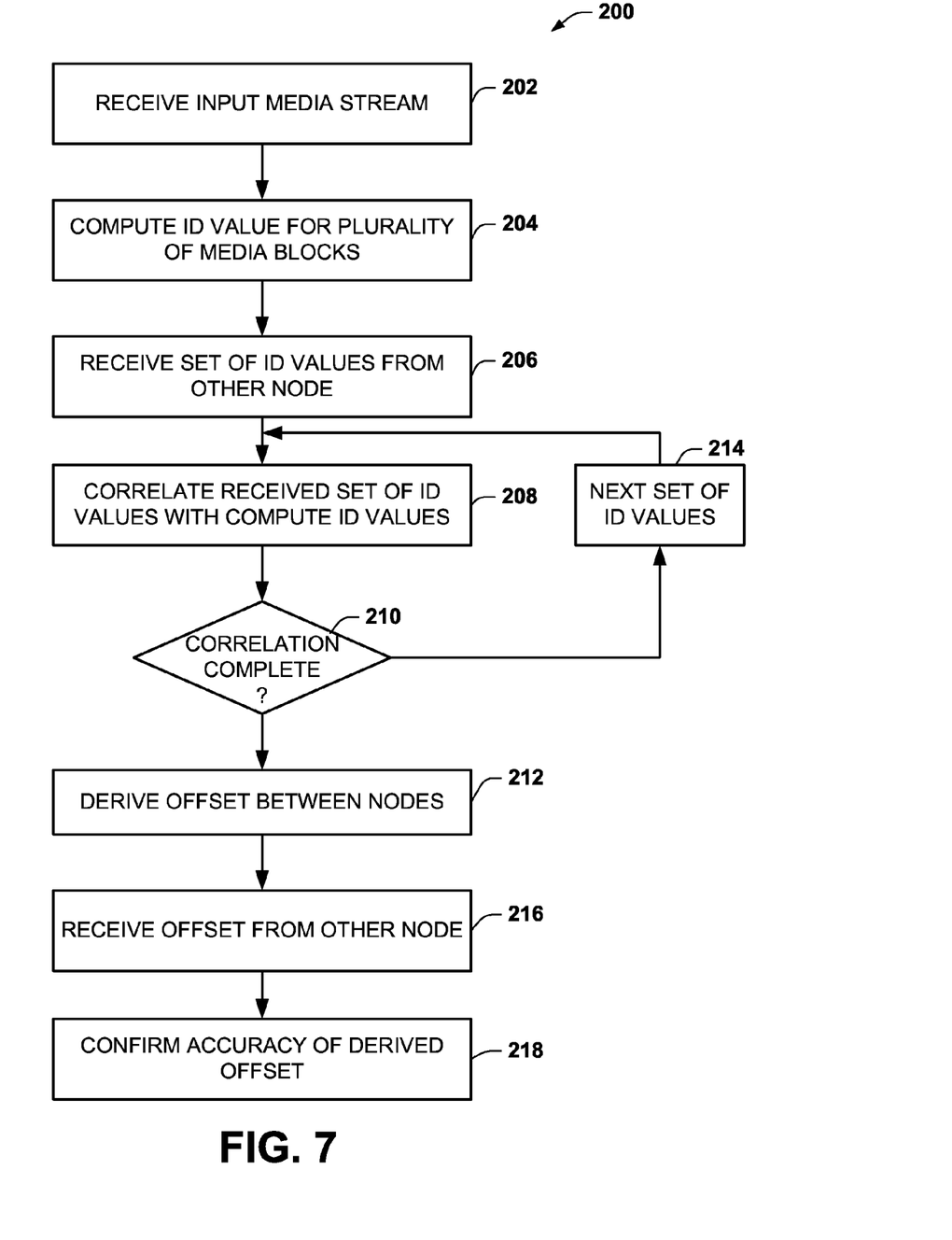
FIG. 7 is a flow diagram depicting an example of a method to facilitate synchronization of media streams.

In view of the foregoing structural and functional features described above, methods that can be implemented will be better appreciated with reference to FIG. 7. While, for purposes of simplicity of explanation, the method of FIG. 7 is shown and described as executing serially, it is to be understood and appreciated that such methods are not limited by the illustrated order, as some aspects could, in other examples, occur in different orders and/or concurrently with other aspects from that disclosed herein. Moreover, not all illustrated features may be required to implement a method. The methods or portions thereof can be implemented as instructions stored in a non-transitory machine readable medium as well as be executed by a processor of a computer device, for example.

FIG. 7 is a flow diagram demonstrating a method 200 that can be implemented to facilitate synchronization of media streams. At 202, the method includes receiving, at an input of a given node (e.g., node 12 or 52), a continuous stream of input media from a media source. As disclosed herein, the stream of input media can include a sequence of video (e.g., picture) blocks, which can include an active video portion and ancillary data. The blocks can correspond to frames or fields, depending on the interface protocol being used to provide the input media.

At 204, an ID value can be computed (e.g., by ID generator 20 or 58) as a function of content in each of a plurality of data blocks in a sequence of the continuous stream of input media received by the given node. For example, the ID value can be computed as a CRC value or a hash key for each block based on the content of each respective block. The ID values can be stored in memory such as in a window of ID data for a predetermined number of media blocks.

At 206, the given node (e.g., node 52) can receive ID values from another node (e.g., node 54), such as via an inter-node communication interface. For instance, the received ID values can be computed for a sequence of a plurality of data blocks in the continuous stream as received by such other node. At 208, the method 200 can include correlating the set of the received ID values from the other node with a set of the computed values for the given node. For example, the set of received ID values can be a limited window of ID data computed for a subset of media blocks. The subset of media blocks in the limited window can be less than or equal in number to the set of media blocks in the window for which the computed ID values are stored. As disclosed herein, the correlation can be implemented for each of the received ID values with respect to a commensurate set of computed ID values over a range of different offset values, such that the sequence of ID values of the received ID data are aligned with different sequences of computed ID values for each correlation (e.g., CRC) that is performed at 208. A value for each correlation can be stored as a correlation result for each pair of ID values being correlated. An aggregate of the correlation results can be a summation of the correlation of each ID value pair for a given offset value.

At 210, an analysis is performed with respect to the aggregate results of each correlation to determine if the limited window of received ID values correlate with a set of ID values computed by the given node. For example, the analysis can compare the aggregate correlation results for each offset value employed for the correlation at 208. If the analysis at 210 indicates that the received values correlate, the method can proceed to 212 to derive an offset for synchronizing between the pair of nodes. As disclosed herein, the derived offset at a given node is the offset that provides a maximum amount of aggregate correlation, which in some examples, can exceed a prescribed correlation threshold. Additionally or alternatively, the derived offset can correspond to an amount of offset that affords the highest amount of correlation among respective sets of ID values.

If the ID values being compared do not correlate or if additional sequential sets remain for comparison, the method can proceed from 210 to 214. At 214, a next set of computed ID values at the given node can be selected (e.g., by control 74) and the method can return to 208 to perform correlation between the next selected set of ID values computed for the given node and the limited set received (at 206) for the other node. The offset can be derived at 212 based on the ID values determined at 210 to correlate, as mentioned above.

Further analysis of the derived offset can be implemented at 216, in response to receiving an offset computed by another node, which is the same node from which the ID values were received at 206. The received offset thus can be computed at such other node similar to process demonstrated at 202-212 and be sent to the given node for receipt at 216. At 218, the offset derived for the given node (at 212) can be compared to the offset received at 216 to confirm the accuracy of the derived offset. For instance, the given node can validate the derived offset if the difference between the absolute values of the derived and received offsets is the same between such pair of nodes. The derived offset can be stored in memory at the given node to enable synchronization of media content that is input to such node relative to common media content that is input to another node, such as disclosed herein. If the derived offset is not validated at 218, the method can return to 202 to repeat the process for different ID values.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A method comprising:
receiving, at a first node, a continuous stream of input media from a media source;
computing a first plurality of values for a plurality of blocks in the continuous stream of input media received at the first node, each value of the first plurality of values being computed as a function of a respective one of the plurality of blocks of the continuous stream;
receiving, at the first node, a second plurality of values computed for the plurality of blocks of the continuous stream received by a second node;
correlating the received second plurality of values from the second node with the first plurality of values computed at the first node; and
determining, in response to correlating the received second plurality of values, an offset between the plurality of blocks of the continuous stream of input media that are received by the first node and the plurality of blocks of the continuous stream of input media that are received by the second node.

2. The method of claim 1, wherein each of the plurality of blocks of the continuous stream of input media received by the first node comprises a field or a frame of the continuous stream of input media received from the media source.

3. The method of claim 1, wherein each of the first plurality of values comprises a unique code computed based on content in each respective block of the plurality of blocks of the continuous steam of input media.

4. The method of claim 3, wherein computing the first plurality of values further comprises computing a cyclic redundancy check value for each of the plurality of blocks of the continuous stream of input media.

5. The method of claim 3, wherein computing the first plurality of values further comprises computing each of the first plurality of values as a function of a predetermined portion of each of the plurality of blocks of the continuous stream of input media.

6. The method of claim 5, wherein the predetermined portion comprises an active video portion of each of the plurality of blocks of the continuous stream of input media.

7. The method of claim 5, wherein the predetermined portion comprises data that is ancillary to an active video portion of each of the plurality of blocks of the continuous stream of input media.

8. The method of claim 1, further comprising:
storing, at the first node, a moving window of the first plurality of values for a sequence of the plurality of blocks of the continuous stream of input media;
wherein the second plurality of values comprises a limited window of the second plurality of values computed for a sequence of the plurality of blocks of the continuous stream of input media received by the second node that includes values for a smaller number of blocks than in the moving window of blocks stored by the first node.

9. The method of claim 8, sending a limited window of the first plurality of values computed by the first node for the sequence of the plurality of blocks from the first node to the second node.

10. The method of claim 8, further comprising:
receiving an offset computed by the second node; and
comparing the offset computed by the second node with the offset computed by the first node to confirm accuracy of the offset computed by the first node.

11. The method of claim 8, wherein correlating further comprises:
correlating each of the second plurality of values computed for the sequence of the plurality of blocks in the limited window from the second node relative to each respective computed value for a sequence of blocks selected according to a corresponding offset at the first node;

aggregating results for each correlation performed for the corresponding offset; and repeating the correlating and aggregating over a sequential range of values for the corresponding offset.

12. The method of claim 1, wherein correlating further comprises comparing aggregate correlation results from the plurality of values being correlated relative to a predetermined threshold to determine if the offset affords sufficient alignment between the blocks of the continuous stream of input media that are received by the first node relative to the blocks of the continuous stream of input media that are received by the second node.

13. An apparatus comprising:

an identifier generator configured to compute an identifier value based on each block of input media content in an input media stream received at a first node from a media source, a first plurality of identifiers computed for a sequence of blocks of the input media content being stored in memory; and an offset calculator configured to:

receive, at the first node, a second plurality of identifiers computed for the sequence of blocks of the input media content received by a second node;

correlate the second plurality of identifiers received from the second node with the first plurality of identifiers computed at the first node; and determine an offset between the sequence of blocks of the input media stream received by the first node and the second node based on the correlation between a set of the first plurality of identifiers for the first node relative to the second plurality of identifiers.

14. The apparatus of claim 13, wherein the identifier generator further comprises:

a block selector configured to select at least a portion of each block from the sequence of the blocks of the input media content in the input media stream received at the first node; and the identifier generator configured to compute the identifier value as a unique code computed based on content in each selected portion of the block of the input media content.

15. The apparatus of claim 14, wherein the identifier generator is configured to store the first plurality of identifiers as a moving window of computed identifier data that includes identifier values computed for each block of the sequence of the blocks of the input media content in the input media stream received at the first node.

16. The apparatus of claim 15, further comprising a data selector configured to select a subset of computed identifier data from the moving window and to send a limited window corresponding to the selected subset of the computed identifier data from the first node to the second node to enable the second node to determine a corresponding offset.

17. The apparatus of claim 15, wherein the second plurality of identifiers computed from the sequence of the blocks of the input media content received at the second node comprises a limited window of identifier data from the second node, wherein the offset calculator further comprises:

a control function configured to cycle through a range of offset values to select a subset of the identifier data; and a correlator configured to correlate each of the identifier values in the limited window of identifier data from the at least one another node with respect to the identifier values in the selected subset of the computed identifier data and to aggregate correlation results for each respective offset value in the range of offset values; and wherein the offset calculator is to compare the aggregate correlation results to determine which offset value affords synchronization between the blocks of the input media stream that are received by the first node relative to the blocks of the input media stream that are received by the at least one other node.

18. The apparatus of claim 13, wherein the offset calculator is configured to compare the offset computed by the first node with respect to another computed offset received from the at least one other node to confirm accuracy of the offset computed by the first node.

19. A system, comprising:

a plurality of nodes configured to receive a continuous stream of input media content from a common media source, each of the plurality of nodes configured to produce and deliver adaptive bitrate media content via a network, each of the plurality of nodes being configured to:

compute a unique identifier value for each block of a sequence of blocks of the continuous stream of input media content received by each respective node;

store a first plurality of identifier values for the sequence of blocks of the continuous stream of input media content;

receive, at the respective node, a second plurality of identifier values computed for the sequence of blocks of the continuous stream received by at least one other node of the plurality of nodes;

correlate the second plurality of identifier values received from the at least one other node with the first plurality of identifier values for the respective node over a range of offset values; and determine a corresponding offset value from the range of offset values that affords synchronization between the sequence of blocks of the continuous stream of input media content that are received by the respective node relative to the sequence of blocks of the continuous stream of input media content that are received by the at least one other node of the plurality of nodes.

20. The system of claim 19, wherein each of the plurality of nodes is further configured to:

store a set of the identifier values as a moving window of computed identifier data computed for each block of the sequence of blocks of the continuous stream of input media content received by each respective node; and select a subset of the computed identifier data and to send a limited window corresponding to the selected subset of the computed identifier data from the respective node to the each other node.

* * * * *